US012692425B2

(12) United States Patent
Itou et al.

(10) Patent No.: US 12,692,425 B2
(45) Date of Patent: Jul. 28, 2026

(54) USE OF A COMPOSITION AS REFRIGERANT IN COMPRESSOR, COMPRESSOR, AND REFRIGERATION CYCLE APPARATUS

(71) Applicant: DAIKIN INDUSTRIES, LTD., Osaka (JP)

(72) Inventors: Yuuko Itou, Osaka (JP); Tomoyuki Goto, Osaka (JP); Takashi Yoshimura, Osaka (JP); Takashi Usui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 159 days.

(21) Appl. No.: 18/238,145

(22) Filed: Aug. 25, 2023

(65) Prior Publication Data

US 2023/0416580 A1 Dec. 28, 2023

Related U.S. Application Data

(63) Continuation of application No. PCT/JP2022/001847, filed on Jan. 19, 2022.

(30) Foreign Application Priority Data

Feb. 26, 2021 (JP) ................................ 2021-030996

(51) Int. Cl.
*C09K 5/04* (2006.01)
*F04C 2/356* (2006.01)
*F25B 31/02* (2006.01)

(52) U.S. Cl.
CPC ............ *C09K 5/045* (2013.01); *F04C 2/3564* (2013.01); *F25B 31/026* (2013.01);
(Continued)

(58) Field of Classification Search
CPC .................. F25B 31/026; F04C 2/3564; F04C 2210/263; F04C 2240/803; F04C 18/3564; C09K 5/045; C09K 2205/126
See application file for complete search history.

(56) References Cited

U.S. PATENT DOCUMENTS 4,252,394 A * 2/1981 Miller .................. H01B 17/305
439/926
5,584,716 A * 12/1996 Bergman ........... H01R 13/5202
439/282
(Continued)

FOREIGN PATENT DOCUMENTS

CN 106460847 A 2/2017
CN 206098769 U * 4/2017
(Continued)

OTHER PUBLICATIONS

Machine Translation of CN 206098769 (Year: 2017).*
(Continued)

*Primary Examiner* — Joseph F Trpisovsky
(74) *Attorney, Agent, or Firm* — Birch, Stewart, Kolasch & Birch, LLP

(57) ABSTRACT

Damages to a refrigerant circuit of a refrigeration cycle apparatus due to a disproportionation reaction are suppressed. The use of a composition as a refrigerant in a compressor is use of, as a refrigerant, a composition containing one or two or more compounds selected from a group consisting of ethylene-based fluoroolefin, 2,3,3,3-Tetrafluoropropene (HFO-1234yf), and 1,3,3,3-Tetrafluoropropene (HFO-1234ze) in a compressor that includes a terminal (200) including a terminal pin (220) and a body (210) to which the terminal pin (220) is fixed, and the terminal pin (220) is fixed to the body (210) with a fixing adhesive (240) having a melting point or a softening point of 1000° C. or less.

8 Claims, 5 Drawing Sheets

(52) U.S. Cl.
CPC .. *C09K 2205/126* (2013.01); *F04C 2210/263* (2013.01); *F04C 2240/803* (2013.01)

(56) References Cited

U.S. PATENT DOCUMENTS

| | | | | |
|---|---|---|---|---|
| 6,164,934 | A * | 12/2000 | Niihara | F04C 23/008 439/282 |
| 2017/0292739 | A1 | 10/2017 | Maeyama | |
| 2021/0163381 | A1 | 6/2021 | Komatsu | |

FOREIGN PATENT DOCUMENTS

| | | | |
|---|---|---|---|
| JP | 63-206136 | A | 8/1988 |
| JP | 4-132885 | A | 5/1992 |
| JP | 2015-69732 | A | 4/2015 |
| JP | 2019-196312 | A | 11/2019 |
| WO | WO 2015/136977 | A1 | 9/2015 |

OTHER PUBLICATIONS

International Search Report, issued in PCT/JP2022/001847, PCT/ISA/210, dated Mar. 1, 2022.
Written Opinion of the International Searching Authority, issued in PCT/JP2022/001847, PCT/ISA/237, dated Mar. 1, 2022.
Extended European Search Report for European Application No. 22759167.4, dated Mar. 15, 2024.
International Preliminary Report on Patentability and English translation of the Written Opinion of the International Searching Authority for International Application No. PCT/JP2022/001847, dated Sep. 7, 2023.

* cited by examiner

USE OF A COMPOSITION AS REFRIGERANT IN COMPRESSOR, COMPRESSOR, AND REFRIGERATION CYCLE APPARATUS

This application is a Bypass Continuation of International Application No. PCT/JP2022/001847, filed on Jan. 19, 2022, which claims the benefit under 35 U.S.C. § 119(a) to Japanese Patent Application No. 2021-030996, filed on Feb. 26, 2021 and Japanese Patent Application No. 2022-006541, filed on Jan. 19, 2022, all of which are hereby expressly incorporated by reference into the present application.

TECHNICAL FIELD

The present disclosure relates to use of a composition as a refrigerant in a compressor, a compressor, and a refrigeration cycle apparatus including the compressor.

BACKGROUND ART

From the viewpoint of global environmental conservation, hydrofluoroolefin (HFO refrigerant) having a lower Global Warming Potential (hereinafter may be simply referred to as GWP) than an HFC refrigerant has attracted attention as a refrigerant used in a refrigeration apparatus. For example, PTL 1 (Japanese Unexamined Patent Publication No. 2019-196312) discusses 1,2-Difluoroethylene (HFO-1132) as a refrigerant having a low GWP.

SUMMARY

A method for conducting a vapor compression refrigeration cycle according to one aspect which employs a compressor having a terminal including a terminal pin and a body to which the terminal pin is fixed, wherein the terminal pin is fixed to the body with a fixing adhesive having a melting point or a softening point of 1000° C. or less and wherein the compressor compresses a refrigerant composition that contains one or more compounds selected from a group consisting of ethylene-based fluoroolefin, 2,3,3,3-Tetrafluoropropene (HFO-1234yf), and 1,3,3,3-Tetrafluoropropene (HFO-1234ze).

A compressor according to one aspect is a compressor comprising a terminal including a terminal pin and a body to which the terminal pin is fixed, the terminal pin being fixed to the body with a fixing adhesive having a melting point or a softening point of 1000° C. or less, wherein the compressor is configured to compress a refrigerant composition containing one or more compounds selected from a group consisting of ethylene-based fluoroolefin, 2,3,3,3-Tetrafluoropropene (HFO-1234yf), and 1,3,3,3-Tetrafluoropropene (HFO-1234ze).

A refrigeration cycle apparatus according to one aspect includes a refrigerant circuit including the compressor according to the above aspect.

DESCRIPTION OF EMBODIMENTS

Figure 1:
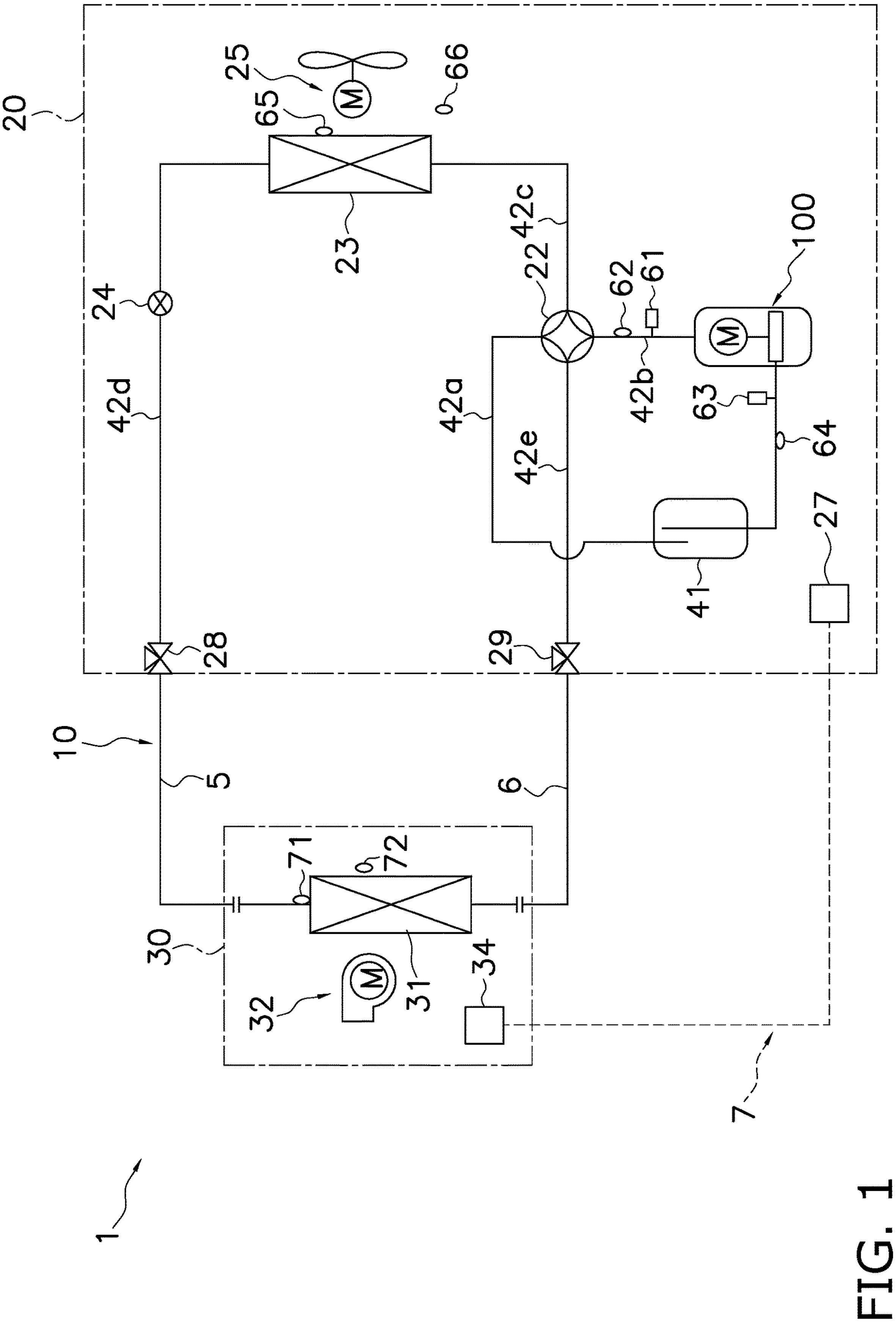
FIG. 1 is a schematic configuration diagram of a refrigeration cycle apparatus according to an embodiment.

A compressor 100, a refrigeration cycle apparatus 1 including the compressor 100, and use of a refrigerant in the compressor 100 and the refrigeration cycle apparatus 1 according to an embodiment will be described.

(1) Refrigerant

A refrigerant filled in a refrigerant circuit 10 of the refrigeration cycle apparatus 1, i.e., a refrigerant used in the compressor 100, will be described.

The refrigerant filled in the refrigerant circuit 10 is a composition containing one or two or more compounds selected from a group consisting of ethylene-based fluoroolefin, 2,3,3,3-Tetrafluoropropene (HFO-1234yf), and 1,3,3,3-Tetrafluoropropene (HFO-1234ze). With regard to the combustion speed defined by ISO817, 1.2 cm/s of 1,3,3,3-Tetrafluoropropene (HFO-1234ze) is preferable in that it is lower than 1.5 cm/s of 2,3,3,3-Tetrafluoropropene (HFO-1234yf). Further, with regard to LFL (Lower Flammability Limit) defined by ISO817, 65000 vol. ppm 6.5% of 1,3,3,3-Tetrafluoropropene (HFO-1234ze) is preferable in that it is higher than 62000 vol. ppm 6.2% of 2,3,3,3-Tetrafluoropropene (HFO-1234yf).

The composition is, for example, a composition of HFO-based refrigerant alone. The composition of the HFO-based refrigerant alone refers to a composition that contains one or two or more compounds of HFO-based refrigerants and does not contain a refrigerant other than HFO-based refrigerants.

Furthermore, the composition may be a mixture of one or two or more compounds of refrigerants selected from a group consisting of ethylene-based fluoroolefin, 2,3,3,3-Tetrafluoropropene (HFO-1234yf), and 1,3,3,3-Tetrafluoropropene (HFO-1234ze), and a hydrofluorocarbon (HFC)-based refrigerant.

For example, the refrigerant filled in the refrigerant circuit 10 is a refrigerant containing one or two or more compounds selected from a group consisting of ethylene-based fluoroolefin, 2,3,3,3-Tetrafluoropropene (HFO-1234yf), and 1,3,3,3-Tetrafluoropropene (HFO-1234ze).

More specifically, the refrigerant includes, but is not limited thereto, one or two or more compounds selected from a group consisting of 1,2-Difluoroethylene (HFO-1132), 1,1-Difluoroethylene (HFO-1132a), 1,1,2-Trifluoroethylene (HFO-1123), monofluoroethylene (HFO-1141), and perhaloolefin. In particular, the refrigerant preferably contains 1,2-Difluoroethylene (HFO-1132) and/or 1,1,2-Trifluoroethylene (HFO-1123).

Please note that 1,2-Difluoroethylene (HFO-1132), 1,1-Difluoroethylene (HFO-1132a), 1,1,2-Trifluoroethylene (HFO-1123), monofluoroethylene (HFO-1141), and perhaloolefin are examples of ethylene-based fluoroolefin. Examples of perhaloolefin include chlorotrifluoroethylene (CFO-1113), tetrafluoroethylene (FO-1114), and the like.

The refrigerant circuit 10 is filled with refrigerating machine oil together with the above-described refrigerant.

(2) Refrigeration Cycle Apparatus (2-1) Overall Outline

Figure 2:
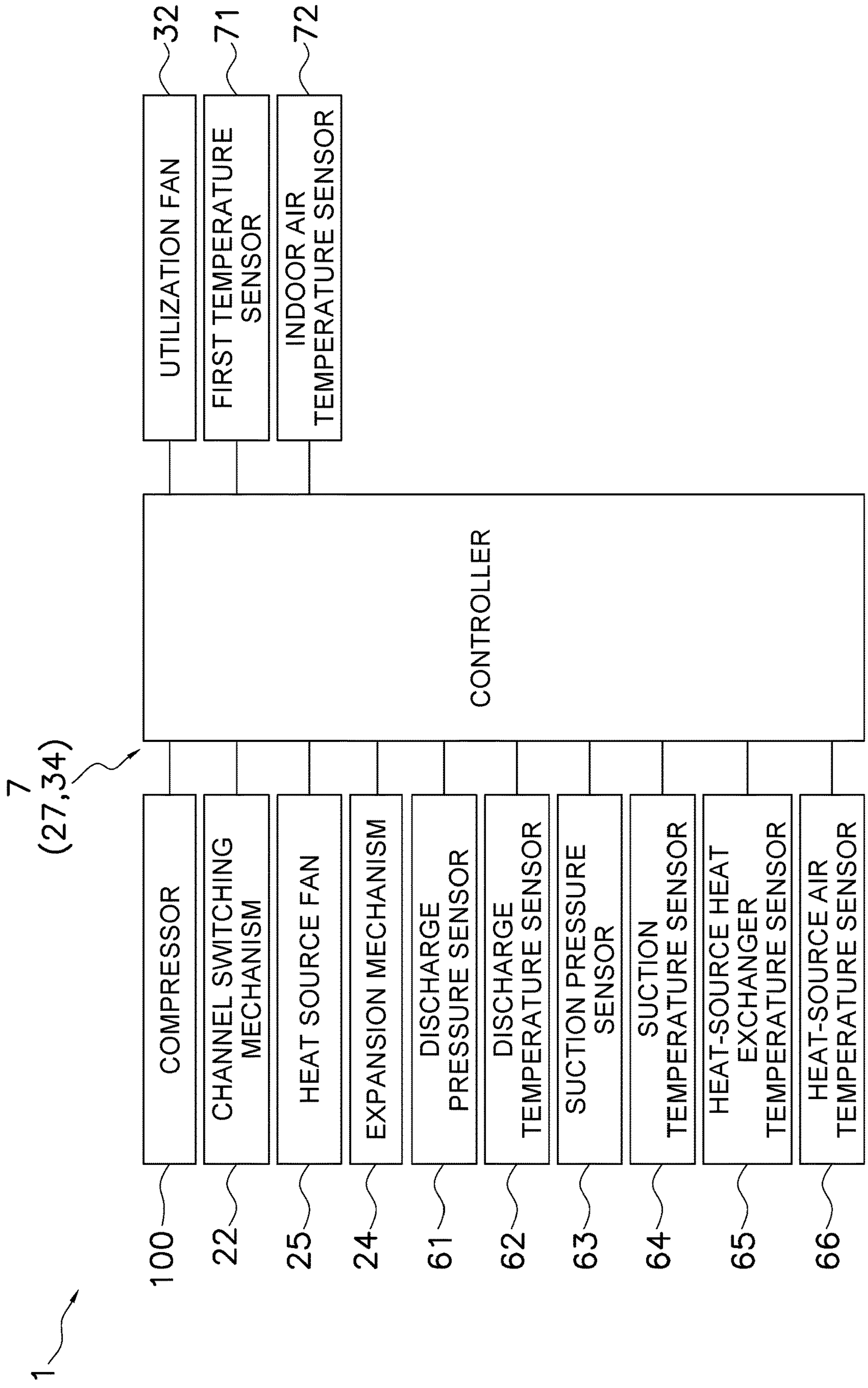
FIG. 2 is a block configuration diagram of the refrigeration cycle apparatus of FIG. 1.

The refrigeration cycle apparatus 1 will be described with reference to FIGS. 1 and 2. FIG. 1 is a schematic configuration diagram of the refrigeration cycle apparatus 1. FIG. 2 is a block configuration diagram of the refrigeration cycle apparatus 1.

The refrigeration cycle apparatus 1 includes the refrigerant circuit 10 in which the above-described refrigerant is sealed. The refrigeration cycle apparatus 1 performs, in the refrigerant circuit 10, a vapor compression refrigeration cycle in which the refrigerant is compressed, radiates heat or is condensed, is decompressed, is heated and evaporated, and is then compressed again. The refrigeration cycle apparatus 1 is an apparatus that performs the above vapor compression refrigeration cycle to process a heat load of a target. According to the present embodiment, the refrigeration cycle apparatus 1 is an air conditioning apparatus that cools and heats air in a target space. However, the type of the refrigeration cycle apparatus 1 is not limited to the air conditioning apparatus and may be a hot water supply apparatus, a floor heater, a chiller, or the like.

As illustrated in FIG. 1, the refrigeration cycle apparatus 1 primarily includes a heat source unit 20, a utilization unit 30, a first connection pipe 5 and a second connection pipe 6 that connect the heat source unit 20 and the utilization unit 30, and a controller 7 that controls an operation of the refrigeration cycle apparatus 1. Although there are the one heat source unit 20 and the one utilization unit 30 in FIG. 1, the refrigeration cycle apparatus 1 may include a plurality of the heat source units 20 or the utilization units 30, or a plurality of both the heat source units 20 and the utilization units 30.

The heat source unit 20, the utilization unit 30, and the controller 7 will be further described below.

(2-2) Detailed Configuration (2-2-1) Heat Source Unit

The heat source unit 20 is installed, for example, outdoors or in a machine chamber.

The heat source unit 20 is connected to the utilization unit 30 via the first connection pipe 5 and the second connection pipe 6 to form part of the refrigerant circuit 10.

The heat source unit 20 primarily includes the compressor 100, a channel switching mechanism 22, a heat-source heat exchanger 23, an expansion mechanism 24, a heat source fan 25, an accumulator 41, a first closing valve 28, and a second closing valve 29 (see FIG. 1). Furthermore, the heat source unit 20 includes a first control unit 27 that controls the operation of various components included in the heat source unit 20. Furthermore, the heat source unit 20 includes sensors such as a discharge pressure sensor 61, a discharge temperature sensor 62, a suction pressure sensor 63, a suction temperature sensor 64, a heat-source heat exchanger temperature sensor 65, and a heat-source air temperature sensor 66.

The compressor 100 is a device that compresses a low-pressure refrigerant in a refrigeration cycle suctioned through a suction port, raises the pressure to a high pressure in the refrigeration cycle, and discharges the refrigerant through a discharge port. The compressor 100 is, for example, a hermetic compressor in which a volumetric compression mechanism such as a rotary type or a scroll type is driven by a drive mechanism. According to the present embodiment, the compressor 100 is a rotary compressor. An operation frequency of a motor as a drive mechanism of the compressor 100 may be controlled by an inverter. Details of the compressor 100 will be described below.

The channel switching mechanism 22 is a mechanism that switches a channel of the refrigerant circuit 10. According to the present embodiment, the channel switching mechanism 22 is a four-way switching valve. The channel switching mechanism 22 may switch the state of the refrigerant circuit 10 between a first state (see the solid line in FIG. 1) in which the discharge port of the compressor 100 is connected to the heat-source heat exchanger 23 and the suction port of the compressor 100 is connected to the second closing valve 29 and a second state (see the broken line in FIG. 1) in which the discharge port of the compressor 100 is connected to the second closing valve 29 and the suction port of the compressor 100 is connected to the heat-source heat exchanger 23. When the state of the refrigerant circuit 10 is the first state, a discharge pipe 42*b* connecting the discharge port of the compressor 100 and the channel switching mechanism 22 is connected to a first gas refrigerant pipe 42*c* connecting the channel switching mechanism 22 and the heat-source heat exchanger 23 and a suction pipe 42*a* connecting the suction port of the compressor 100 and the channel switching mechanism 22 is connected to a second gas refrigerant pipe 42*e* connecting the channel switching mechanism 22 and the second closing valve 29. When the state of the refrigerant circuit 10 is the second state, the discharge pipe 42*b* is connected to the second gas refrigerant pipe 42*e*, and the suction pipe 42*a* is connected to the first gas refrigerant pipe 42*c*. When the refrigeration cycle apparatus 1 performs a cooling operation, the channel switching mechanism 22 switches the state of the refrigerant circuit 10 to the first state. When the refrigeration cycle apparatus 1 performs a heating operation, the channel switching mechanism 22 switches the state of the refrigerant circuit 10 to the second state.

Please note that the channel switching mechanism 22 does not need to be implemented by the four-way switching valve, and may be configured by a plurality of valves to enable switching between the first state and the second state described above.

The heat-source heat exchanger 23 functions as a radiator or a condenser of a high-pressure refrigerant in the refrigeration cycle during a cooling operation of the refrigeration cycle apparatus 1 and functions as an evaporator of a low-pressure refrigerant in the refrigeration cycle during a heating operation.

In the heat-source heat exchanger 23 according to the present embodiment, heat is exchanged between the air as a heat source and the refrigerant, but this is not a limitation. The heat-source heat exchanger 23 may be a type of heat exchanger in which heat is exchanged between a medium such as water and the refrigerant. The type of heat exchanger used as the heat-source heat exchanger 23 may be selected as appropriate.

The expansion mechanism 24 is provided in a liquid refrigerant pipe 42*d* connecting the heat-source heat exchanger 23 and the first closing valve 28 in the refrigerant circuit 10. According to the present embodiment, the expansion mechanism 24 is an electronic expansion valve whose valve opening degree is adjustable. However, the type of the expansion mechanism 24 is not limited to an electronic expansion valve, and may be a thermostatic expansion valve having a temperature sensitive cylinder, or a capillary tube.

The heat source fan 25 generates an air flow so that the air as a heat source outside a casing (not illustrated) of the heat source unit 20 is suctioned into the casing and supplied to the heat-source heat exchanger 23 and the air having exchanged heat with the refrigerant in the heat-source heat exchanger 23 is discharged out of the casing. The heat source fan 25 is driven by a heat source fan motor.

The accumulator 41 is provided in the suction pipe 42*a*. The accumulator 41 is a refrigerant container that has a gas-liquid separation function and may store an excess refrigerant in the refrigerant circuit 10 as a liquid refrigerant.

The first closing valve 28 is a manual valve disposed at the connection portion between the heat source unit 20 and the first connection pipe 5. The second closing valve 29 is a manual valve disposed at the connection portion between the heat source unit 20 and the second connection pipe 6.

The first control unit 27 includes a microcomputer including a CPU, a memory, and the like. The first control unit 27 is connected to a second control unit 34 of the utilization unit 30 described below via a communication line to transmit and receive control signals, and the like, to and from the second control unit 34.

The discharge pressure sensor 61, the discharge temperature sensor 62, the suction pressure sensor 63, the suction temperature sensor 64, the heat-source heat exchanger temperature sensor 65, the heat-source air temperature sensor 66, and the like, are provided in the heat source unit 20. These sensors 61 to 66 are electrically connected to the first control unit 27 to transmit detection signals to the first control unit 27. The discharge pressure sensor 61 detects the pressure of the refrigerant flowing through the discharge pipe 42*b*. The discharge temperature sensor 62 detects the temperature of the refrigerant flowing through the discharge pipe 42*b*. The suction pressure sensor 63 detects the pressure of the refrigerant flowing through the suction pipe 42*a*. The suction temperature sensor 64 detects the temperature of the refrigerant flowing through the suction pipe 42*a*. The heat-source heat exchanger temperature sensor 65 is attached to the heat-source heat exchanger 23 to detect the temperature of the refrigerant flowing through the heat-source heat exchanger 23. The heat-source air temperature sensor 66 detects the temperature of the heat source air before passing through the heat-source heat exchanger 23.

(2-2-2) Utilization Unit

The utilization unit 30 is installed on, for example, a wall surface, a ceiling, a floor, or the like, of a room that is the target space, or an attic of the target space.

The utilization unit 30 is connected to the heat source unit 20 via the first connection pipe 5 and the second connection pipe 6 to form part of the refrigerant circuit 10.

The utilization unit 30 primarily includes a utilization heat exchanger 31 and a utilization fan 32 (see FIG. 1). Furthermore, the utilization unit 30 includes the second control unit 34 that controls the operation of various components included in the utilization unit 30. Further, the utilization unit 30 includes sensors such as a first temperature sensor 71 and an indoor air temperature sensor 72.

One end of the utilization heat exchanger 31 is connected to the first connection pipe 5, and the other end is connected to the second connection pipe 6. The utilization heat exchanger 31 functions as an evaporator of a low-pressure refrigerant in the refrigeration cycle during a cooling operation of the refrigeration cycle apparatus 1 and functions as a radiator or a condenser of a high-pressure refrigerant in the refrigeration cycle during a heating operation. The type of heat exchanger used as the utilization heat exchanger 31 may be selected as appropriate.

The utilization fan 32 generates an air flow so that the air in the air-conditioning target space is suctioned into a casing (not illustrated) of the utilization unit 30 and supplied to the utilization heat exchanger 31 and the air having exchanged heat with the refrigerant in the utilization heat exchanger 31 is blown out of the casing. The utilization fan 32 is driven by a utilization fan motor.

The second control unit 34 includes a microcomputer including a CPU, a memory, and the like. The second control unit 34 is connected to the first control unit 27 of the heat source unit 20 via a communication line to transmit and receive control signals, and the like, to and from the first control unit 27.

The first temperature sensor 71, the indoor air temperature sensor 72, and the like, are provided in the utilization unit 30. The sensors 71, 72 are electrically connected to the second control unit 34 to transmit detection signals to the second control unit 34. The first temperature sensor 71 is provided in a pipe connecting the first connection pipe 5 and the utilization heat exchanger 31 to detect the temperature of the refrigerant flowing through the pipe. The indoor air temperature sensor 72 detects the temperature of the air in the air-conditioning target space.

(2-2-3) Controller

In the refrigeration cycle apparatus 1, the first control unit 27 of the heat source unit 20 is connected to the second control unit 34 of the utilization unit 30 via a communication line to form the controller 7 that controls the operation of the refrigeration cycle apparatus 1.

The controller 7 controls the operations of various components of the heat source unit 20 and the utilization unit 30 based on instructions from a remote controller (not illustrated), detection values of various sensors provided in the heat source unit 20 and the utilization unit 30, and the like.

(2-3) Operation of Refrigeration Cycle Apparatus

The refrigeration cycle apparatus 1 may perform at least a cooling operation for cooling the air-conditioning target space and a heating operation for heating the air-conditioning target space. The controller 7, which controls the operation of the refrigeration cycle apparatus 1, determines whether to perform the cooling operation or the heating operation based on an instruction received from a remote controller, or the like, and executes it.

In the cooling operating mode, the controller 7 controls the operation of the channel switching mechanism 22 such that the state of the refrigerant circuit 10 becomes the first state. Further, the controller 7 controls, for example, the operating frequency of the compressor 100 and the opening degree of the electronic expansion valve as the expansion mechanism 24 such that the temperature of the air-conditioning target space reaches the target temperature.

In the cooling operating mode, the gas refrigerant discharged from the compressor 100 flows into the heat-source heat exchanger 23 via the channel switching mechanism 22 and is condensed in the heat-source heat exchanger 23. The refrigerant flowing out of the heat-source heat exchanger 23 toward the utilization unit 30 is decompressed when passing through the expansion mechanism 24. The refrigerant decompressed by the expansion mechanism 24 flows through the first connection pipe 5, flows into the utilization heat exchanger 31 of the utilization unit 30, evaporates in the utilization heat exchanger 31, and flows to the second connection pipe 6. The refrigerant flowing through the second connection pipe 6 is suctioned into the compressor 100 again via the channel switching mechanism 22 and the accumulator 41.

In the heating operating mode, the controller 7 controls the operation of the channel switching mechanism 22 such that the state of the refrigerant circuit 10 becomes the second state. Further, the controller 7 controls, for example, the operating frequency of the compressor 100 and the opening degree of the electronic expansion valve as the expansion mechanism 24 such that the temperature of the air-conditioning target space reaches the target temperature.

In the heating operating mode, the gas refrigerant discharged from the compressor 100 is sent to the utilization unit 30 via the channel switching mechanism 22 and the second connection pipe 6, flows into the utilization heat exchanger 31, and is condensed or radiates heat in the utilization heat exchanger 31. The refrigerant having passed through the utilization heat exchanger 31 is sent to the heat source unit 20 via the first connection pipe 5. The refrigerant having flowed into the heat source unit 20 is decompressed when passing through the expansion mechanism 24. The refrigerant decompressed by the expansion mechanism 24 flows into the heat-source heat exchanger 23, evaporates in the heat-source heat exchanger 23, passes through the channel switching mechanism 22 and the accumulator 41, and is again suctioned into the compressor 100.

(3) Compressor

Figure 3:
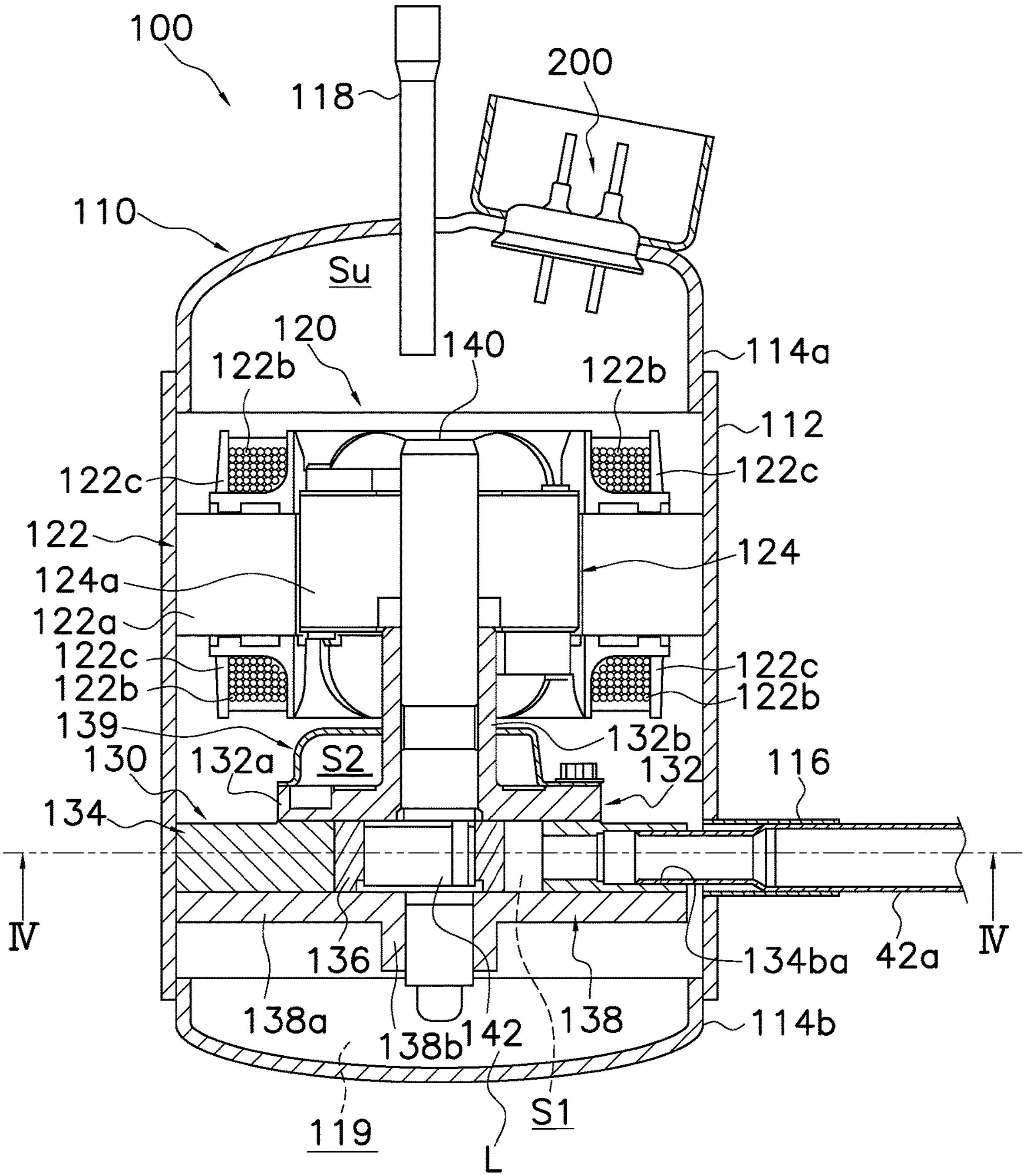
FIG. 3 is a side cross-sectional view illustrating a schematic configuration of a compressor according to an example used in the refrigeration cycle apparatus of FIG. 1.
Figure 4:
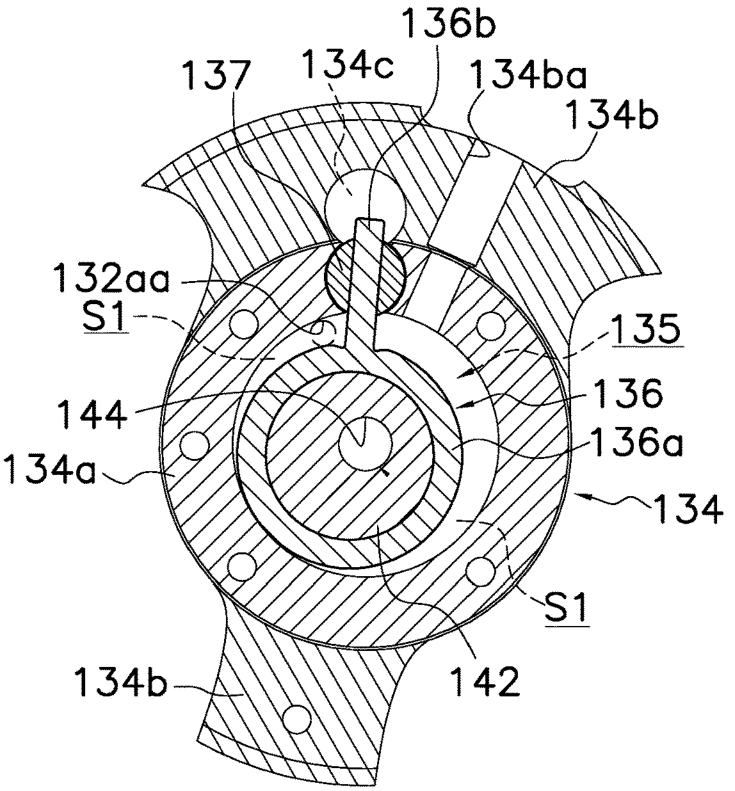
FIG. 4 is a schematic cross-sectional view of a compression mechanism of the compressor of FIG. 3 taken along a line IV-IV.
Figure 5:
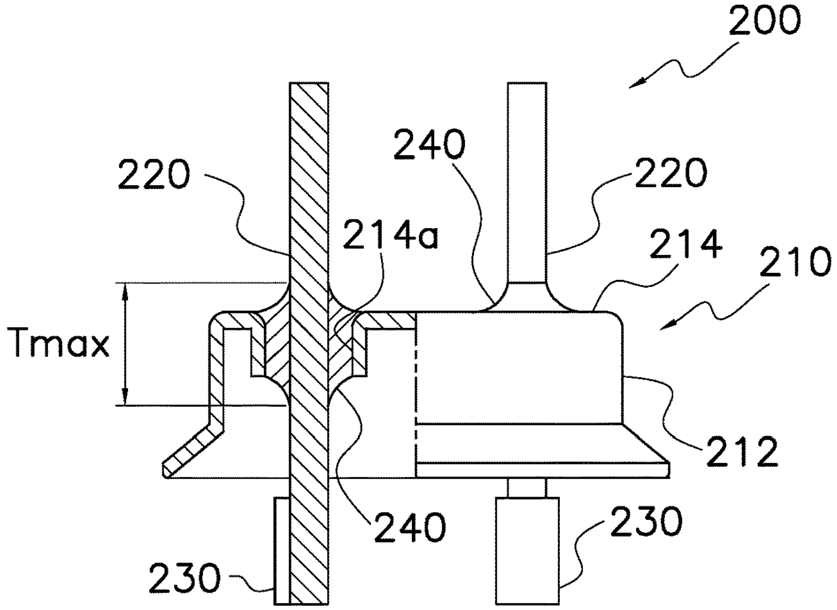
FIG. 5 is a diagram, a partially cross-sectional view, illustrating a schematic structure of a terminal attached to the compressor of FIG. 3.
Figure 6:
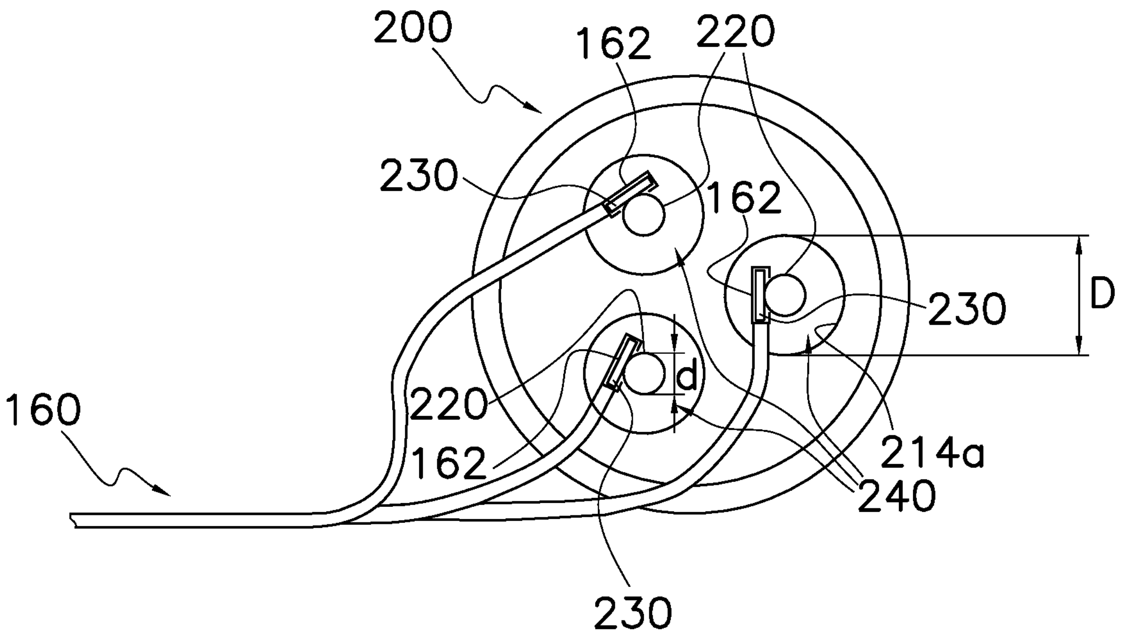
FIG. 6 is a schematic view of the terminal attached to the compressor of FIG. 3 when viewed from an inner side of the compressor.

The compressor 100 of the refrigeration cycle apparatus 1 will be described in detail with reference to FIGS. 3 to 6. FIG. 3 is a side cross-sectional view illustrating a schematic configuration of the compressor 100. FIG. 4 is a schematic cross-sectional view of the compression mechanism of the compressor 100 taken along a line IV-IV in FIG. 3. FIG. 5 is a diagram, a partially cross-sectional view, illustrating a schematic structure of a terminal 200 of the compressor 100. FIG. 6 is a diagram of the terminal 200 attached to the compressor 100 when viewed from an inner side (from bottom) of the compressor 100.

As illustrated in FIG. 3, the compressor 100 according to the present embodiment is a 1-cylinder type rotary compressor. However, this is not a limitation, and the compressor 100 may be, for example, a 2-cylinder type rotary compressor.

The compressor 100 primarily includes a casing 110, a drive mechanism 120, a compression mechanism 130, a drive shaft 140, and the terminal 200.

(3-1) Casing

The casing 110 is a vertical cylindrical container.

The casing 110 includes a cylindrical member 112 having a cylindrical shape with upper and lower openings and an upper lid 114*a* and a lower lid 114*b* that are shaped like bowls and provided at an upper end and a lower end of the cylindrical member 112, respectively (see FIG. 3). The upper lid 114*a* and the lower lid 114*b* are fixed to the cylindrical member 112 by welding to maintain airtightness.

The cylindrical member 112 is provided with a suction pipe connection portion 116, and the suction pipe 42*a* is inserted into the suction pipe connection portion 116. The suction pipe 42*a* inserted into the suction pipe connection portion 116 is coupled to the compression mechanism 130 (see FIG. 3). The upper lid 114*a* is provided with a discharge pipe connection portion 118 (see FIG. 3), and the discharge pipe 42*b* is connected to the discharge pipe connection portion 118. The high-pressure refrigerant compressed by the compression mechanism 130 is discharged to the discharge pipe 42*b* via the discharge pipe connection portion 118.

The drive mechanism 120, the compression mechanism 130, and the drive shaft 140 are housed inside the casing 110. An oil reservoir space 119, in which refrigerating machine oil L for lubricating the compression mechanism 130 and the like is stored, is formed in a lower portion of the casing 110 (see FIG. 3).

The terminal 200 is attached to the upper lid 114*a* of the casing 110.

(3-2) Drive Mechanism

The drive mechanism 120 is a mechanism that drives the compression mechanism 130. According to the present embodiment, the drive mechanism 120 is a motor.

The drive mechanism 120 is disposed above the compression mechanism 130.

The drive mechanism 120 primarily includes a stator 122 and a rotor 124. The rotor 124 is disposed inside the stator 122, which is formed in a cyclic shape, with a slight gap (air gap) from the stator 122 (see FIG. 3).

The stator 122 primarily includes a cyclic stator core 122*a*, a winding 122*b* wound around the stator core 122*a*, and insulators 122*c* disposed above an upper end surface and below a lower end surface of the stator core 122*a* (see FIG. 3).

The stator core 122*a* is fixed to the cylindrical member 112 of the casing 110. For example, the stator core 122*a* is fixed to the inside of the cylindrical member 112 by interference fit such as shrink fit or press fit. Please note that the method for fixing the stator core 122*a* and the cylindrical member 112 is not limited to these methods, and the stator core 122*a* and the cylindrical member 112 may be fixed by welding.

The insulator 122*c* is disposed at an upper part of the inner peripheral side of the cyclic stator core 122*a* and adjacent to the stator core 122*a*. The insulator 122*c* is disposed below at an lower part of the inner peripheral side of the cyclic stator core 122*a* and adjacent to the stator core 122*a*. The winding 122*b* is wound around the stator core 122*a* via the insulator 122*c*. The winding 122*b* is connected to the terminal 200 attached to the casing 110 via a lead wire 160 (see FIG. 6). An external power source supplies electric power to the winding 122*b* via the terminal 200 and the lead wire 160. When a current flows to the winding 122*b* wound around the stator core 122*a* via the lead wire 160, a rotating magnetic field is generated in the stator 122.

The rotor 124 is a cylindrical member. The rotor 124 primarily includes a cylindrical rotor core 124*a* (see FIG. 3) and a plurality of permanent magnets (not illustrated). The rotor core 124*a* is formed by stacking a plurality of cyclic electromagnetic steel sheets. The permanent magnet is, for example, a plate magnet. The plurality of permanent magnets are arranged so as to surround the rotation axis of the rotor 124 (the rotation axis of the drive shaft 140).

The drive shaft 140 is inserted and fixed in a hollow portion of the rotor core 124*a*.

The drive shaft 140 includes an eccentric portion 142. The drive shaft 140 is coupled to a roller 136*a* of a piston 136 of the compression mechanism 130 at the eccentric portion 142. In short, the drive shaft 140 is coupled to the rotor 124 and the compression mechanism 130.

When a current is supplied to the drive mechanism 120 and a current flows to the winding 122*b*, the rotor 124 is rotated by the rotating magnetic field generated in the stator 122. When the rotor 124 rotates, the drive shaft 140 connected to the rotor core 124*a* also rotates, and a driving force is applied to the compression mechanism 130 via the drive shaft 140.

An oil channel 144 for guiding the refrigerating machine oil L stored in the oil reservoir space 119 in the lower portion of the casing 110 to a slide portion of the compressor 100 is formed inside the drive shaft 140 coupling the compression mechanism 130 and the drive mechanism 120. The slide portion of the compressor 100 includes a slide portion between the piston 136 and a cylinder 134, a front head 132, and a rear head 138, and a slide portion between the drive shaft 140 and an upper bearing portion 132*b* of the front head 132 and a lower bearing portion 138*b* of the rear head 138, described below. During the operation of the compressor 100, the refrigerating machine oil L stored in the oil reservoir space 119 is sent to the slide portion through the oil channel 144 by using a pressure difference, a centrifugal force, or the like.

(3-3) Compression Mechanism

The compression mechanism 130 is a mechanism that compresses the refrigerant suctioned from the suction pipe 42*a*.

The compression mechanism 130 is housed in a lower portion of the casing 110 below the drive mechanism 120 (see FIG. 3).

As illustrated in FIGS. 3 and 4, the rotary type compression mechanism 130 primarily includes the front head 132, the cylinder 134, the piston 136, the rear head 138, and a muffler 139. The front head 132, the cylinder 134, the piston 136, and the rear head 138 are made of, for example, cast iron.

(a) Cylinder

The cylinder 134 includes a cylindrical portion 134*a* having a cylindrical shape with upper and lower end surfaces opened and an outer extending portion 134*b* extending outward (toward the casing 110) from the cylindrical portion 134*a* in a plan view (see FIG. 4). An end portion of the outer extending portion 134*b* is fixed to the cylindrical member 112 of the casing 110, and thus the cylinder 134 is fixed to the cylindrical member 112.

The piston 136 that compresses the refrigerant is housed in a cylindrical space surrounded by an inner peripheral surface of the cylindrical portion 134*a* (see FIG. 4).

The outer extending portion 134*b* is provided with a suction hole 134*ba* that suctions a low-pressure refrigerant in the refrigeration cycle (see FIG. 4). The suction hole 134*ba* extends so as to communicate from an opening formed in the inner peripheral surface of the cylindrical portion 134*a* to an opening formed in the outer peripheral surface of the outer extending portion 134*b*. An end portion of the suction pipe 42*a* is inserted into the suction hole 134*ba* through the opening of the suction hole 134*ba* formed in the outer peripheral surface of the outer extending portion 134*b* (see FIG. 3).

The front head 132 is disposed above the cylinder 134 so as to close the upper opening of the cylindrical portion 134*a* (see FIG. 3). The rear head 138 is disposed below the cylinder 134 so as to close the lower opening of the cylindrical portion 134*a* (see FIG. 3). The front head 132, the cylinder 134, and the rear head 138 are coupled to each other as a single unit with, for example, a bolt. A cylinder chamber 135 is formed by the inner peripheral surface of the cylindrical portion 134*a* of the cylinder 134, the lower surface of the front head 132, and the upper surface of the rear head 138. The piston 136 is disposed in the cylinder chamber 135 (see FIG. 3). A compression chamber S1 in which the refrigerant is compressed is formed by the inner peripheral surface of the cylindrical portion 134*a* of the cylinder 134, the lower surface of the front head 132, the upper surface of the rear head 138, and the outer peripheral surface of the piston 136 disposed in the cylinder chamber 135 (see FIGS. 3 and 4).

Further, a blade swinging space 134*c*, in which a bushing 137 and a blade 136*b* of the piston 136 described below are disposed, is formed in the cylinder 134. The blade swinging space 134*c* is formed so as to extend from a cylindrical space surrounded by the inner peripheral surface of the cylindrical portion 134*a* toward the outer peripheral side in the vicinity of the suction hole 134*ba*. The blade swinging space 134*c* is formed across the cylindrical portion 134*a* and the outer extending portion 134*b*. The cylinder 134 swingably supports the blade 136*b* of the piston 136 via the bushing 137 disposed in the blade swinging space 134*c*.

(b) Front Head

As illustrated in FIG. 3, the front head 132 includes a front head disc portion 132*a* that closes an upper opening of the cylindrical portion 134*a* of the cylinder 134 and the upper bearing portion 132*b* that extends upward from a central portion of the front head disc portion 132*a*. The upper bearing portion 132*b* has a cylindrical shape and functions as a bearing of the drive shaft 140.

The front head disc portion 132*a* is provided with a discharge hole 132*aa* through which the refrigerant compressed in the compression chamber S1 is discharged (see FIG. 4). A discharge valve (not illustrated) is provided above the discharge hole 132*aa* to open and close the discharge hole 132*aa*. The discharge valve is opened due to a pressure difference when the pressure in the compression chamber S1 becomes higher than the pressure in a muffler space S2 described below so that the refrigerant is discharged from the discharge hole 132*aa* to the muffler space S2.

(c) Rear Head

As illustrated in FIG. 3, the rear head 138 includes a rear head disc portion 138*a* that closes the lower opening of the cylindrical portion 134*a* of the cylinder 134 and a lower bearing portion 138*b* that extends downward from a central portion of the rear head disc portion 138*a*. The lower bearing portion 138*b* has a cylindrical shape and functions as a bearing of the drive shaft 140.

(d) Piston

The piston 136 is disposed in the cylinder chamber 135. The piston 136 is mounted on the eccentric portion 142 of the drive shaft 140.

The piston 136 is a member in which the cylindrical roller 136*a* and a plate-shaped blade 136*b* extending from the outer surface of the roller 136*a* in the radial direction of the roller 136*a* are formed as a single unit.

The roller 136*a* is disposed in the cylinder chamber 135. The eccentric portion 142 of the drive shaft 140 is fitted into a hollow portion of the roller 136*a*.

The blade 136*b* of the piston 136 is disposed in the blade swinging space 134*c* formed in the cylinder 134 and is swingably supported by the cylinder 134 via the bushing 137 disposed in the blade swinging space 134*c*. Further, the blade 136*b* is slidable with respect to the bushing 137 in the longitudinal direction of the blade 136*b*. During the operation of the compressor 100, the blade 136*b* repeatedly moves into the blade swinging space 134*c* and moves out of the blade swinging space 134*c* while swinging with respect to the cylinder 134.

As illustrated in FIG. 4, the roller 136*a* and the blade 136*b* of the piston 136 partition the cylinder chamber 135 to form the compression chamber S1 whose volume is changed by the revolution of the piston 136. When the drive shaft 140 rotates, the roller 136*a* revolves with respect to the cylinder 134. Accordingly, the volume of the compression chamber S1 changes, and the low-pressure refrigerant suctioned from the suction pipe 42*a* is compressed into a high-pressure refrigerant, and is then discharged from the discharge hole 132*aa* to the muffler space S2.

(e) Muffler

As illustrated in FIG. 3, the muffler 139 is attached to an upper surface of a peripheral edge portion of the front head disc portion 132*a* of the front head 132. The muffler 139 is provided with a central muffler opening (not illustrated) having substantially the same shape as the outer shape of the upper bearing portion 132*b* to allow the upper bearing portion 132*b* to pass therethrough, and the upper bearing portion 132*b* is inserted into the central muffler opening.

The muffler 139 forms the muffler space S2 together with the upper surface of the front head disc portion 132*a* and the outer peripheral surface of the upper bearing portion 132*b*. The muffler space S2 is a space that reduces noise associated with discharge of the refrigerant from the compression chamber S1. The muffler space S2 and the compression chamber S1 communicate with each other via the discharge hole 132*aa* when the above-described discharge valve (not illustrated) disposed above the discharge hole 132*aa* is opened.

The muffler 139 is further provided with a muffler discharge hole through which the refrigerant flows from the muffler space S2 to the outside of the muffler space S2 (a housing space of the drive mechanism 120 in the casing 110).

Please note that the muffler space S2, the housing space of the drive mechanism 120, the space (referred to as an upper space Su) above the drive mechanism 120 in which the lower end of the discharge pipe connection portion 118 is disposed, and the oil reservoir space 119 below the compression mechanism 130 all communicate with each other. When the compressor 100 in operation enters a steady state, these spaces become high-pressure spaces in the refrigeration cycle. The steady state of the compressor 100 means that the compressor 100 has completed the control at the time of start-up and the inside of the compressor 100 is in a state with little pressure fluctuations, or the like.

(3-4) Terminal

The terminal 200 is attached to the upper lid 114*a* of the casing 110. The terminal 200 primarily includes a body 210, three terminal pins 220, and a terminal plate 230 provided on each of the terminal pins 220 (see FIG. 6).

The material of the body 210 is, for example, iron or stainless steel. The material of the terminal pin 220 is, for example, iron-chromium alloy or copper.

The body 210 is a member that supports the terminal pin 220. The body 210 is a substantially hat-shaped member. The body 210 includes a substantially cylindrical sidewall portion 212 and a circular plate 214 that closes one end side of the sidewall portion 212. The other end side (the side on which the circular plate 214 is not present) of the sidewall portion 212 is open. The terminal 200 is attached to the casing 110 such that the side of the body 210 on which the circular plate 214 is present is disposed outside the casing 110 and the open side of the body 210 is disposed inside the casing 110. The sidewall portion 212 of the body 210 to which the terminal pin 220 is fixed is fixed to the upper lid 114*a* of the casing 110 by welding.

The terminal pin 220 is a columnar member. The terminal pin 220 extends through a hole 214*a* formed in the circular plate 214 of the body 210 (see FIG. 5). The three terminal pins 220 extend substantially parallel to each other.

The terminal plate 230 is fixed to an end portion of each of the terminal pins 220 on the inner side of the casing 110 (the side on which the sidewall portion 212 of the body 210 is open) (see FIGS. 5 and 6). A terminal 162, which is attached to a tip of an end portion of the lead wire 160 for connecting the winding 122*b* of the stator 122 of the drive mechanism 120 and the terminal 200, is connected to each of the terminal plates 230 (see FIG. 6). Although not illustrated here, a terminal for connecting an electric wire of an external power source may be provided at an end portion of each of the terminal pins 220 on the outer side of the casing 110 (the side of the body 210 on which the circular plate 214 is present).

The body 210 and the terminal pin 220 are fixed to each other with a sealing member 240 (fixing adhesive) to seal the gap between the body 210 and the terminal pin 220 in an airtight manner. The fixing adhesive as the sealing member 240 is an insulating material. Further, the melting point of the fixing adhesive as the sealing member 240 is 1000° C. or less. The material of the fixing adhesive used for the sealing member 240 is, but not limited thereto, glass. Specifically, the glass of the fixing adhesive used for the sealing member 240 is, for example, soda barium-based glass or borosilicate-based glass. As the fixing adhesive, a material is selected, which has a melting point of 1000° C. or less and does not melt under a normal use condition (use temperature) of the compressor 100.

When a diameter d of the terminal pin 220 is, for example, 3.2 mm, a diameter D of the hole 214*a* formed in the circular plate 214 of the body 210, into which the terminal pin 220 is inserted, is preferably 6.4 mm or more and 9.6 mm or less. In other words, when the diameter d of the terminal pin 220 is 3.2 mm, the cross-sectional area of the sealing member 240 cut along a plane perpendicular to the longitudinal direction of the terminal pin 220 is preferably 24.1 $mm^2$ or more and 64.0 $mm^2$ or less. The ratio (D/d) of the diameter D of the hole 214*a* to the diameter d of the terminal pin 220 is preferably in the range of 2.0 to 3.0.

More preferably, when the diameter d of the terminal pin 220 is 3.2 mm, the diameter D of the hole 214*a* is 8.0 mm or more and 9.6 mm or less. In other words, when the diameter d of the terminal pin 220 is 3.2 mm, the cross-sectional area of the sealing member 240 cut along a plane perpendicular to the longitudinal direction of the terminal pin 220 is more preferably 42.4 $mm^2$ or more and 64.0 $mm^2$ or less. More preferably, the ratio (D/d) of the diameter D of the hole 214*a* to the diameter d of the terminal pin 220 is in the range of 2.5 to 3.0.

Furthermore, when the diameter d of the terminal pin 220 is different from 3.2 mm, for example, the diameter of the hole 214*a* may be determined based on the range of the ratio described above.

Furthermore, when the diameter d of the terminal pin 220 is, for example, 3.2 mm, a maximum value Tmax of the thickness of the sealing member 240 in the longitudinal direction of the terminal pin 220 (the insertion direction of the terminal pin 220) is preferably 5.8 mm or more and 8.8 mm or less. The ratio (Tmax/d) of the maximum value Tmax of the thickness of the sealing member 240 to the diameter d of the terminal pin 220 is preferably in the range of 1.8 to 2.8.

More preferably, when the diameter d of the terminal pin 220 is 3.2 mm, the maximum value Tmax of the thickness of the sealing member 240 is 7.0 mm or more and 8.8 mm or less. More preferably, the ratio (Tmax/d) of the maximum value Tmax of the thickness of the sealing member 240 to the diameter d of the terminal pin 220 is in the range of 2.2 to 2.8.

(4) Operation of Compressor

The operation of the compressor 100 will be described.

In the compressor 100, when the drive mechanism 120 is operated so that the drive shaft 140 rotates, the roller 136*a* of the piston 136 of the compression mechanism 130 revolves due to the eccentric rotation of the eccentric portion 142 of the drive shaft 140. When the roller 136*a* revolves, the volume of the compression chamber S1 communicating with the suction pipe 42*a* gradually increases, and the low-pressure refrigerant is suctioned from the suction pipe 42*a* into the compression chamber S1. When the roller 136*a* of the piston 136 further revolves, the communication state between the compression chamber S1 and the suction pipe 42*a* is eliminated, and the compression of the refrigerant is started in the compression chamber S1 which is in the communication state with the discharge hole 132*aa*. Thereafter, the volume of the compression chamber S1 in the communication state with the discharge hole 132*aa* gradually decreases, and the pressure of the refrigerant is increased. The refrigerant having a high pressure due to the decrease in the volume of the compression chamber S1 pushes and opens the discharge valve provided in the discharge hole 132*aa* and is discharged from the discharge hole 132*aa* to the muffler space S2. The refrigerant flowing into the muffler space S2 flows into a space above the compression mechanism 130 from a muffler discharge hole (not illustrated) of the muffler 139. The refrigerant having flowed into the space above the compression mechanism 130 passes through the gap between the stator 122 and the rotor 124 of the drive mechanism 120, and the like, cools the drive mechanism 120, and is then discharged to the discharge pipe 42*b* via the discharge pipe connection portion 118.

(5) Behavior of Compressor at Time of Abnormal Increase in Temperature in Terminal Next, the behavior of the compressor at the time of abnormal increase in the temperature in the terminal 200 will be described.

In the terminal 200, there is a possibility of an abnormal increase in the temperature due to the reason below.

The terminal pin 220 of the terminal 200 may be attached with foreign substances such as metal abrasion powder generated by sliding of various members in the compressor 100 and carbide derived from the refrigerating machine oil, etc. When such a foreign substance adheres to the terminal pin 220, a current flows between the adjacent terminal pins 220 via the foreign substance (the terminal pins 220 are short-circuited), and Joule heat may be generated. If the temperature were raised to 1000° C. or more due to Joule heat, the terminal 200 may serve as an ignition source for a disproportionation reaction of the refrigerant used in the compressor 100.

However, the melting point of the sealing member 240 (fixing adhesive), which fixes the terminal pin 220 of the terminal 200 of the compressor 100 to the body 210, is 1000° C. or less. Therefore, even when a current flows between the adjacent terminal pins 220 through the foreign substance, Joule heat is generated, and the temperature of the terminal 200 rises, the sealing member 240 melts before the temperature of the terminal 200 reaches 1000° C.

As a result, there is an expected effect that the melted sealing member 240 (fixing adhesive) flows along the terminal pin 220 and the foreign substance adhering to the terminal pin 220 flows down. When the foreign substance is removed from the terminal pin 220, no current flows between the terminal pins 220, and the occurrence of a disproportionation reaction is suppressed.

Further, when a relatively large amount of the sealing member 240 (fixing adhesive) is melted due to Joule heat, it is expected that the terminal pin 220 separates from the body 210. In this case, in particular, when the operation of the compressor 100 is a steady state, the pressure inside the casing 110 of the compressor 100 (the pressure in the upper space Su) is a high pressure in the refrigeration cycle, and therefore, the terminal pin 220 separated from the body 210 usually ejects out of the casing 110 due to a pressure difference. Furthermore, the size of the hole 214*a* of the body 210 of the terminal 200 is preferably designed to be sufficiently larger than the size of the terminal pin 220 to which the terminal plate 230 is attached so that the terminal pin 220 easily ejects out of the casing 110.

Furthermore, the lead wire 160 connecting the terminal pin 220 and the winding 122*b* of the stator 122 of the drive mechanism 120 of the compressor 100 is preferably designed to have a strength and length so as to be disconnected when the sealing member 240 melts and the terminal pin 220 separates from the body 210 and ejects out of the casing 110. Specifically, a strength and length of the lead wire 160 connecting the terminal pin 220 and the winding 122*b* of the stator 122 is preferably designed so that the lead wire 160 is disconnected when, under the condition that the inside of the casing 110 has a predetermined pressure, the sealing member 240 melts and the terminal pin 220 separates from the body 210 and ejects out of the casing 110. For example, the value of the pressure assumed during the steady operation of the compressor 100 may be used as the predetermined value of the pressure. Such a design is made based on, for example, simulation or experiment. When the lead wire 160 is disconnected, no electric power is supplied to the compressor 100, and thus the compressor 100 stops. As a result, the temperature of the terminal 200 does not rise any more, and the occurrence of a disproportionation reaction is suppressed.

When a relatively large amount of the sealing member 240 (fixing adhesive) melts due to Joule heat, the refrigerant flows out of the casing 110 through the hole 214*a* formed in the circular plate 214 of the body 210. The controller 7 of the refrigeration cycle apparatus 1 is preferably configured to detect a shortage of the refrigerant based on detection values, or the like, of various sensors provided in the refrigeration cycle apparatus 1 and to stop the compressor 100 when the shortage of the refrigerant is detected. As a result, even when the lead wire 160 is not disconnected, the compressor 100 may be stopped to suppress the occurrence of a disproportionation reaction.

(6) Features of Present Embodiment 6-1

The use of a composition as the refrigerant in the compressor 100 according to the present embodiment is use of a composition as a refrigerant in a compressor 100, in which the composition contains one or two or more compounds selected from a group consisting of ethylene-based fluoroolefin, 2,3,3,3-Tetrafluoropropene (HFO-1234yf), and 1,3,3,3-Tetrafluoropropene (HFO-1234ze), the compressor 100 has the terminal 200 including the terminal pin 220 and the body 210 to which the terminal pin 220 is fixed, and the terminal pin 220 is fixed to the body 210 with the sealing member 240 (the fixing adhesive as the sealing member 240) having a melting point of 1000° C. or less.

In the terminal 200 of the compressor 100, foreign substances such as carbide derived from the refrigerant or the refrigerating machine oil or metal abrasion powder may adhere to the terminal pin 220, and current may flow between the terminal pins 220 via the foreign substance to generate Joule heat. If such an event occurs in a case where the refrigerant containing HFO is used as the refrigerant in the compressor 100, a disproportionation reaction may occur with the terminal 200 as an ignition source.

However, here, the melting point of the sealing member 240 (fixing adhesive) of the terminal pin 220 of the terminal 200 of the compressor 100 is lower than 1000° C. at which a disproportionation reaction may occur. Therefore, before the temperature of the terminal 200 rises and exceeds 1000° C. due to Joule heat, the foreign substance adhering to the terminal pin 220 may be removed by the melted fixing adhesive, or the sealing member 240 of the terminal pin may be damaged to stop the compressor 100 prior to the occurrence of a disproportionation reaction occurs. As a result, damages to the refrigerant circuit 10 of the refrigeration cycle apparatus 1 due to the disproportionation reaction may be suppressed.

6-2

According to the present embodiment, the composition preferably contains one or two or more compounds selected from a group consisting of 1,2-Difluoroethylene (HFO-1132), 1,1-Difluoroethylene (HFO-1132a), 1,1,2-Trifluoroethylene (HFO-1123), monofluoroethylene (HFO-1141), and perhaloolefin.

Here, 1,2-Difluoroethylene may be trans-1,2-Difluoroethylene [(E)-HFO-1132], cis-1,2-Difluoroethylene [(Z)—HFO-1132], or a mixture thereof.

More preferably, the composition contains 1,2-Difluoroethylene (HFO-1132) and/or 1,1,2-Trifluoroethylene (HFO-1123).

6-3

The sealing member 240 (fixing adhesive) is preferably glass. Such a configuration may ensure insulation and airtightness while preventing the melting point from being 1000° C. or more.

6-4

Preferably, the maximum thickness Tmax of the portion of the sealing member 240 (fixing adhesive) in the insertion direction of the terminal pin 220 into the body 210 is 5.8 mm or more and 8.8 mm or less.

By setting the maximum thickness Tmax of the portion of the sealing member 240 in this range, it is possible to secure a sufficient amount of fixing adhesive while suppressing the amount of the fixing adhesive used to some extent, and to flow down the foreign substance adhering to the terminal pin 220 by using the melted fixing adhesive.

6-5

Preferably, the lead wire 160 connecting the terminal pin 220 and the stator 122 of the drive mechanism 120 of the compressor 100 is designed so as to be disconnected when the sealing member 240 (fixing adhesive) melts and the terminal pin 220 separates from the body 210 under the condition that the inside of the casing 110 has a predetermined pressure. For example, the value of the pressure assumed during the steady operation of the compressor 100 may be used as the predetermined value of the pressure. The design of the lead wire 160 includes, for example, the design of the length and strength of the lead wire 160. When the lead wire 160 is disconnected, the compressor 100 stops.

As a result of such a configuration, when a current flows between the terminal pins 220 and the sealing member 240 melts, the lead wire 160 is disconnected and the compressor 100 stops; thus, it is possible to stop the compressor 100 at an early stage when the temperature of the terminal 200 rises and to suppress the occurrence of a disproportionation reaction.

6-6

Preferably, the refrigeration cycle apparatus 1 is configured such that, when the sealing member 240 (fixing adhesive) melts, the inside of the compressor 100 communicates with the outside, and the refrigerant flows out of the compressor 100, the compressor 100 is stopped due to a shortage of the refrigerant.

As a result of such a configuration, when a current flows between the terminal pins 220 and the sealing member 240 melts, the compressor 100 is stopped due to a shortage of the refrigerant. Therefore, it is possible to stop the compressor 100 at an early stage and suppress the occurrence of a disproportionation reaction.

6-7

Preferably, the ratio (D/d) of the diameter D of the hole 214*a* formed in the body 210 into which the terminal pin 220 is inserted to the diameter d of the terminal pin 220 is 2.0 or more and 3.0 or less.

The ratio (D/d) of the diameter D of the hole 214*a* to the diameter d of the terminal pin 220 falls within the above range, and therefore, when the sealing member 240 (fixing adhesive) melts, the refrigerant may be quickly discharged out of the compressor 100 through the hole 214*a*, the compressor 100 may be stopped at an early stage due to a shortage of the refrigerant, and the occurrence of a disproportionation reaction may be suppressed. Furthermore, as the diameter D of the hole 214*a* is not unnecessarily large, it is possible to suppress a decrease in the strength of the sealing member 240 of the terminal pin 220.

(7) Modification

Modifications of the above-described embodiment will be described below. The details of the modifications below may be combined with part or all of the configurations according to the above-described embodiment as long as there are no contradictions with each other.

Further, part or all of the modifications may be combined with part or all of another modification as long as there are no contradictions with each other.

(7-1) Modification A

In the example described according to the above embodiment, the compressor 100 is a rotary compressor, but the type of the compressor 100 is not limited to a rotary compressor. The compressor 100 may be another type of compressor, such as a scroll compressor including the terminal 200.

(7-2) Modification B

The above embodiment describes the use of, as the refrigerant, the composition containing one or two or more compounds selected from the group consisting of ethylene-based fluoroolefin, 2,3,3,3-Tetrafluoropropene (HFO-1234yf), and 1,3,3,3-Tetrafluoropropene (HFO-1234ze) in the compressor 100 including the terminal 200 in which the fixing adhesive as the sealing member 240 has a melting point of 1000° C. or less.

However, the present disclosure is not limited to such a configuration. The use of a composition according to the present disclosure may be the use of a composition as the refrigerant in the compressor 100, in which the composition contains one or two or more substances selected from the group consisting of ethylene-based fluoroolefin, 2,3,3,3-Tetrafluoropropene (HFO-1234yf), and 1,3,3,3-Tetrafluoropropene (HFO-1234ze), and the compressor 100 includes the terminal 200 in which the fixing adhesive as the sealing member 240 has a softening point of 1000° C. or less. The softening point is the temperature at which the composition begins to soften and deform. The material of the fixing adhesive used for the sealing member 240 is, but not limited thereto, glass.

In a case where the softening point of the sealing member 240 is 1000° C. or less, when a current flows between the adjacent terminal pins 220 via a foreign substance, Joule heat is generated, and the temperature of the terminal 200 rises, the sealing member 240 starts to deform before the temperature of the terminal 200 reaches 1000° C.

As a result, it is expected that the sealing member 240 gets deformed or damaged and the terminal pin 220 separates from the body 210. In this case, in particular, when the operation of the compressor 100 is in the steady state, the pressure inside the casing 110 of the compressor 100 (the pressure in the upper space Su) is a high pressure in the refrigeration cycle as described above, and therefore, the terminal pin 220 separated from the body 210 may usually eject out of the casing 110 due to a pressure difference.

As in the above-described embodiment, a strength and length of the lead wire 160 connecting the terminal pin 220 and the winding **122*b* of the stator 122 of the drive mechanism 120 of the compressor 100 is preferably designed so that the lead wire 160 is disconnected when the sealing member 240 is deformed or damaged and the terminal pin 220 separates from the body 210 and ejects out of the casing 110**.

Further, as in the above-described embodiment, the refrigeration cycle apparatus 1 is preferably configured to stop the compressor 100 due to a shortage of the refrigerant when the sealing member 240 (fixing adhesive) is deformed or damaged, the inside of the compressor 100 communicates with the outside, and the refrigerant flows out of the compressor 100.

Furthermore, as in the above-described embodiment, the ratio (D/d) of the diameter D of the hole **214*a* formed in the body 210 into which the terminal pin 220 is inserted to the diameter d of the terminal pin 220 is preferably 2.0 or more and 3.0 or less. As the ratio (D/d) of the diameter D of the hole 214*a* to the diameter d of the terminal pin 220 falls within the above range, when the sealing member 240 (fixing adhesive) is deformed or damaged, the refrigerant may be quickly discharged out of the compressor 100 through the hole 214*a*, the compressor 100 may be stopped at an early stage due to a shortage of the refrigerant, and the occurrence of a disproportionation reaction may be suppressed. Furthermore, as the diameter D of the hole 214*a* is not unnecessarily large, it is possible to suppress a decrease in the strength of the sealing member 240 of the terminal pin 220**.

<Note>

Although the embodiment of the present disclosure has been described above, it is understood that various modifications may be made to forms and details without departing from the spirit and scope of the present disclosure described in the scope of claims.

REFERENCE SIGNS LIST

1 Refrigeration cycle apparatus
10 Refrigerant circuit
100 Compressor
200 Terminal
210 Body
220 Terminal pin
240 Sealing member (fixing adhesive)

CITATION LIST

Patent Literature

[Patent Literature 1] Japanese Unexamined Patent Application Publication No. 2019-196312

The invention claimed is:

1. A method for conducting a vapor compression refrigeration cycle which employs a compressor having a terminal including a terminal pin and a body to which the terminal pin is fixed, wherein the terminal pin is fixed to the body with a fixing adhesive having a melting point or a softening point of 1000° C. or less and the compressor compresses a refrigerant composition comprising one or more compounds selected from a group consisting of ethylene-based fluoroolefin, 2,3,3,3-Tetrafluoropropene (HFO-1234yf), and 1,3,3,3-Tetrafluoropropene (HFO-1234ze), and a ratio (Tmax/d) of a maximum value (Tmax) of a thickness of the fixing adhesive to a diameter (d) of the terminal pin is in a range of 1.8 to 2.8.

2. The method according to claim 1, wherein the refrigerant composition comprises, as the ethylene-based fluoroolefin, one or more compounds selected from a group consisting of 1,2-Difluoroethylene (HFO-1132), 1,1-Difluoroethylene (HFO-1132a), 1,1,2-Trifluoroethylene (HFO-1123), monofluoroethylene (HFO-1141), and perhaloolefin.

3. The method according to claim 2, wherein the refrigerant composition comprises at least one of 1,2-Difluoroethylene (HFO-1132) and 1,1,2-Trifluoroethylene (HFO-1123).

4. A compressor comprising a terminal including a terminal pin and a body to which the terminal pin is fixed, the terminal pin being fixed to the body with a fixing adhesive having a melting point or a softening point of 1000° C. or less, wherein the compressor is configured to compress a refrigerant composition comprising one or more compounds selected from a group consisting of ethylene-based fluoroolefin, 2,3,3,3-Tetrafluoropropene (HFO-1234yf), and 1,3,3,3-Tetrafluoropropene (HFO-1234ze), and a ratio (Tmax/d) of a maximum value (Tmax) of a thickness of the fixing adhesive to a diameter (d) of the terminal pin is in a range of 1.8 to 2.8.

5. A refrigeration cycle apparatus comprising a refrigerant circuit which includes a compressor having a terminal including a terminal pin and a body to which the terminal pin is fixed, wherein the terminal pin is fixed to the body with a fixing adhesive having a melting point or a softening point of 1000° C. or less and the compressor is configured to compress a refrigerant composition comprising one or two or more compounds selected from a group consisting of ethylene-based fluoroolefin, 2,3,3,3-Tetrafluoropropene (HFO-1234yf), and 1,3,3,3-Tetrafluoropropene (HFO-1234ze), and a ratio (Tmax/d) of a maximum value (Tmax) of a thickness of the fixing adhesive to a diameter (d) of the terminal pin is in a range of 1.8 to 2.8.

6. The method according to claim 1, wherein a ratio (D/d) of a diameter (D) of a hole formed in the body and into which the terminal pin is inserted to the diameter (d) of the terminal pin is in a range of 2.0 to 3.0.

7. The compressor according to claim 4, wherein a ratio (D/d) of a diameter (D) of a hole formed in the body and into which the terminal pin is inserted to the diameter (d) of the terminal pin is in a range of 2.0 to 3.0.

8. The refrigeration cycle apparatus according to claim 5, wherein a ratio (D/d) of a diameter (D) of a hole formed in the body and into which the terminal pin is inserted to the diameter (d) of the terminal pin is in a range of 2.0 to 3.0.

* * * * *